(12) United States Patent
Zhao et al.

(10) Patent No.: US 11,876,474 B2
(45) Date of Patent: Jan. 16, 2024

(54) LINEAR RESONANT DEVICE, AND BRAKING METHOD FOR SAME

(71) Applicant: SHANGHAI AWINIC TECHNOLOGY CO., LTD, Shanghai (CN)

(72) Inventors: Guanxing Zhao, Shanghai (CN); Shaofu Wu, Shanghai (CN); Dajun Wu, Shanghai (CN); Zhijun Meng, Shanghai (CN)

(73) Assignee: SHANGHAI AWINIC TECHNOLOGY CO., LTD, Shanghai (CN)

( * ) Notice: Subject to any disclaimer, the term of this patent is extended or adjusted under 35 U.S.C. 154(b) by 406 days.

(21) Appl. No.: 17/293,377

(22) PCT Filed: Dec. 12, 2019

(86) PCT No.: PCT/CN2019/124781
§ 371 (c)(1),
(2) Date: May 12, 2021

(87) PCT Pub. No.: WO2020/125533
PCT Pub. Date: Jun. 25, 2020

(65) Prior Publication Data
US 2022/0014123 A1    Jan. 13, 2022

(30) Foreign Application Priority Data
Dec. 20, 2018    (CN) .................. 201811567088.X

(51) Int. Cl.
*H04M 19/04* (2006.01)
*H02P 3/02* (2006.01)
(Continued)

(52) U.S. Cl.
CPC .............. *H02P 3/02* (2013.01); *G06F 3/016* (2013.01); *H02P 3/18* (2013.01); *H02P 25/032* (2016.02); *H02P 25/06* (2013.01); *H02P 2209/13* (2013.01)

(58) Field of Classification Search
CPC .. H02P 3/02; H02P 25/032; H02P 3/18; H02P 25/06; H02P 2209/13; G06F 3/016; H04M 19/047
See application file for complete search history.

(56) References Cited

U.S. PATENT DOCUMENTS

2011/0163985 A1    7/2011 Bae et al.
2014/0247227 A1*   9/2014 Jiang .................. H10N 30/204
                                                  345/173
(Continued)

FOREIGN PATENT DOCUMENTS

CN    102340279 A    2/2012
CN    105389000 A    3/2016
(Continued)

OTHER PUBLICATIONS

The First Chinese Office Action dated Jan. 13, 2023; Appln. No. 201811567088.X.
(Continued)

*Primary Examiner* — Cortez M Cook
(74) *Attorney, Agent, or Firm* — Emerson, Thomson & Bennett, LLC; Roger D. Emerson; Jarrett Wyatt

(57) ABSTRACT

A linear resonant device and a braking method for the same. The linear resonant device comprises a linear resonant motor and a drive chip. The drive chip pre-stores a drive waveform and at least one first braking waveform therein. The method comprises: determining, in response to a braking instruction, whether vibration of the linear resonant motor meets a first condition while being driven by the drive waveform; and if so, controlling the drive chip to drive, by using the first
(Continued)

braking waveform, the linear resonant motor and to conduct a first braking process for the linear resonant motor, wherein the first braking waveform comprises at least two pulse waveforms, and an amplitude value of each of the at least two pulse waveforms gradually decreases along a propagation direction of the first braking waveform.

19 Claims, 4 Drawing Sheets

(51) Int. Cl.
    *H02P 25/032*     (2016.01)
    *G06F 3/01*     (2006.01)
    *H02P 3/18*     (2006.01)
    *H02P 25/06*     (2016.01)

(56) References Cited

U.S. PATENT DOCUMENTS

| | | |
|---|---|---|
| 2015/0054769 A1 | 2/2015 | Kamata et al. |
| 2015/0054808 A1 | 2/2015 | Kamata et al. |
| 2016/0063826 A1 | 3/2016 | Morrell et al. |
| 2018/0059793 A1 | 3/2018 | Hajati |
| 2018/0182212 A1 | 6/2018 | Li et al. |
| 2019/0204922 A1* | 7/2019 | Deng .................. H04M 19/047 |

FOREIGN PATENT DOCUMENTS

| | | |
|---|---|---|
| CN | 105630021 A | 6/2016 |
| CN | 106487309 A | 3/2017 |
| CN | 107024985 A | 8/2017 |
| CN | 107665051 A | 2/2018 |
| CN | 108181988 A | 6/2018 |
| CN | 108334193 A | 7/2018 |
| CN | 108429507 A | 8/2018 |
| CN | 109710067 A | 5/2019 |
| JP | 5907260 B2 | 4/2016 |

OTHER PUBLICATIONS

Texas Instruments; "DRV2625 Ultra Low Power Closed-Loop LRA/ERM Haptic Driver with Built-in Library", SLOS8979B—Apr. 2014—Revised Sep. 2016—77 pages. www.ti.com; XP55629370A.

Texs Instruments; "DRV2605L-Q1 Automotive Haptic Driver for LRA and ERM with Effect Library and Smart-Loop Architecture", SLOS874B—Oct. 2015—Revised Apr. 2018; 70 pages-XP55629374A.

The Extended European Search Report dated Jan. 28, 2022; Appln. No. 19900112.4.

International Search Report dated Mar. 11, 2020; PCT/CN2019/124781.

* cited by examiner

LINEAR RESONANT DEVICE, AND BRAKING METHOD FOR SAME

The present application is a national phase application of PCT international patent application PCT/CN2019/124781, filed on Dec. 12, 2019 which claims priority to Chinese Patent Application No. 201811567088.X, titled "LINEAR RESONANT DEVICE, AND BRAKING METHOD FOR SAME", filed on Dec. 20, 2018 with the China National Intellectual Property Administration, both of which are incorporated herein by reference in their entireties.

FIELD

The present disclosure relates to the technical field of motors, and in particular to a linear resonance device and a method for braking the linear resonance device.

BACKGROUND

With the tactile feedback technology, different tactile experiences can be received based on different application scenarios, so that a user can more deeply interact with an electronic product. The tactile feedback technology becomes an important trend in a future smart terminal. In a smartphone which serves as an important application field of the tactile feedback technology, a subtle vibration of a clock dial, a heartbeat, and even other vibrations such as shooting and punching in some games can be simulated by a tactile feedback engine, thereby improving a game experience.

Currently, the tactile feedback technology is generally implemented through vibration of a motor. A linear resonance actuator (LRA) includes a spring, a mass block with magnetism and a coil. The coil is suspended in the linear resonance actuator by the spring. The coil produces a magnetic field when a current flows through the coil. The coil is connected to the mass block with magnetism. A direction and an intensity of the magnetic field vary with a change in the current flowing through the coil so that the mass block moves up and down in the changing magnetic field. This movement of the mass block is perceived by the user, to produce a tactile feedback effect. It can be seen that vibrations of different intensities can be produced in an electronic device by the linear resonance actuator, so as to implement tactile feedbacks of different intensities.

With the development of electronic technology, there are more ways to implement the tactile feedback by the linear resonance actuator, and user experience requirements become high. Therefore, after the linear resonance actuator implements tactile feedback, how to fast and effectively brake the linear resonance actuator becomes an urgent technical problem to be solved by those skilled in the art.

SUMMARY

To solve the above technical problems, a linear resonance device and a method for braking the linear resonance device are provided according to embodiments of the present disclosure, so as to fast and effectively brake the linear resonance device.

In order to solve the above problems, the following technical solutions are provided according to the embodiments of the present disclosure.

A method for braking a linear resonance device is provided. The linear resonance device includes a linear resonance actuator and a driving chip. The driving chip pre-stores a driving waveform signal and at least one first braking waveform signal. The method includes: in response to a braking instruction, determining whether a vibration of the linear resonance actuator under driving of the driving waveform signal meets a first condition; in a case that the vibration of the linear resonance actuator meets the first condition, controlling the driving chip to output the first braking waveform signal to drive the linear resonance actuator to perform a first braking process on the linear resonance actuator; and in a case that the first braking process meets a second condition, controlling the driving chip to stop outputting the first braking waveform signal, to finish braking the linear resonance actuator. The first braking waveform signal includes at least two pulses. Among the at least two pulses, an amplitude of a preceding pulse is greater than an amplitude of a succeeding pulse.

Optionally, the first braking waveform signal includes a first pulse and a second pulse. The controlling the driving chip to output the first braking waveform signal to drive the linear resonance actuator includes: controlling the driving chip to output the first pulse prior to the second pulse. An amplitude AMP(i) of the first pulse and an amplitude AMP(i+1) of the second pulse meet the following equation:

$$AMP(i+1)=\text{floor}(N*AMP(i)/2^m).$$

where, i represents an integer not less than 1, N represents a pulse amplitude attenuation factor, m represents the number of bits of the pulse amplitude attenuation factor stored in a register, and the floor function is a ROUNDDOWN function.

Optionally, the second condition includes that the number of pulses in the first braking waveform signal outputted by the driving chip reaches a first preset value.

Optionally, the driving chip further pre-stores at least one second braking waveform signal, where the method further includes: in a case that the vibration of the linear resonance actuator does not meet the first condition, controlling the driving chip to output the second braking waveform signal to drive the linear resonance actuator to perform a second braking process on the linear resonance actuator; in a case that the second braking process meets a third condition, controlling the driving chip to output the first braking waveform signal to drive the linear resonance actuator to perform the first braking process on the linear resonance actuator; and in a case that the first braking process meets the second condition, controlling the driving chip to stop outputting the first braking waveform signal, to finish braking the linear resonance actuator. The second braking waveform signal includes at least one pulse, and an amplitude of the pulse in the second braking waveform signal is not less than a maximum amplitude among amplitudes of pulses in the first braking waveform signal.

Optionally, the second braking waveform signal includes at least two pulses, and the at least two pulses in the second braking waveform signal have a same amplitude.

Optionally, a maximum amplitude among amplitudes of pulses in the first braking waveform signal is the same as an amplitude of any one of the at least two pulses in the second braking waveform signal.

Optionally, the pulse in the second braking waveform signal has a same frequency as the pulse in the first braking waveform signal.

Optionally, the method further includes: adjusting a frequency of the first braking waveform signal outputted by the driving chip based on a frequency of the vibration of the linear resonance actuator under driving of the driving waveform signal.

Optionally, the method further includes: determining whether a braking instruction is received when stopping outputting the driving waveform signal.

A linear resonance device includes a linear resonance actuator, a driving chip and a processor. The driving chip pre-stores a driving waveform signal and at least one first braking waveform signal. The processor is configured to: in response to a braking instruction, determine whether a vibration of the linear resonance actuator under driving of the driving waveform signal meets a first condition; in a case that the vibration of the linear resonance actuator meets the first condition, control the driving chip to output the first braking waveform signal to drive the linear resonance actuator to perform a first braking process on the linear resonance actuator; and in a case that the first braking process meets a second condition, control the driving chip to stop outputting the first braking waveform signal, to finish braking the linear resonance actuator. The first braking waveform signal includes at least two pulses. Among the at least two pulses, an amplitude of a preceding pulse is greater than an amplitude of a succeeding pulse.

Optionally, the driving chip includes a register, a static random-access memory and a drive controller. The static random-access memory is configured to pre-store at least one first braking waveform signal. The processor is configured to output a first control instruction in a case that the vibration of the linear resonance actuator meets the first condition. The register is configured to, in response to the first control instruction, trigger the drive controller to read the first braking waveform signal in the static random-access memory, to perform the first braking process on the linear resonance actuator.

Optionally, the first braking waveform signal includes a first pulse and a second pulse. The controlling the driving chip to output the first braking waveform signal to drive the linear resonance actuator includes: controlling the driving chip to output the first pulse prior to the second pulse. An amplitude AMP(i) of the first pulse and an amplitude AMP (i+1) of the second pulse meet the following equation:

$$AMP(i+1)=\text{floor}(N*AMP(i)/2^m).$$

where i represents an integer not less than 1, N represents a pulse amplitude attenuation factor, m represents the number of bits of the pulse amplitude attenuation factor stored in a register, and a floor function is a ROUNDDOWN function.

Optionally, the second condition includes that the number of pulses in the first braking waveform signal outputted by the driving chip reaches a first preset value.

Optionally, the static random-access memory further pre-stores at least one second braking waveform signal. In a case that the vibration of the linear resonance actuator does not meet the first condition, the processor is configured to output a second control instruction. The register is configured to, in response to the second control instruction, trigger the driving chip to output the second braking waveform signal to drive the linear resonance actuator to perform a second braking process on the linear resonance actuator. In a case that the second braking process meets a third condition, the processor is configured to output a first control instruction. The register is configured to, in response to the first control instruction, trigger the driving chip to output the first braking waveform signal to drive the linear resonance actuator to perform the first braking process on the linear resonance actuator. In a case that the first braking process meets the second condition, the processor is configured to control the driving chip to stop outputting the first braking waveform signal, to finish braking the linear resonance actuator. The second braking waveform signal comprises at least one pulse, and an amplitude of the pulse in the second braking waveform signal is not less than a maximum amplitude among amplitudes of pulses in the first braking waveform signal.

Optionally, the second braking waveform signal includes at least two pulses, and the at least two pulses in the second braking waveform signal have a same amplitude.

Optionally, a maximum amplitude among amplitudes of pulses in the first braking waveform signal is the same as an amplitude of any one of the at least two pulses in the second braking waveform signal.

Optionally, the pulse in the second braking waveform signal has a same frequency as the pulse in the first braking waveform signal.

Optionally, the linear resonance device further includes a clock chip. The processor is further configured to: adjust a sampling frequency of the clock chip to a preset frequency based on a frequency of the vibration of the linear resonance actuator under driving of the driving waveform signal, to control the driving chip to read the first braking waveform signal in the static random-access memory at the preset frequency, to output the first braking waveform signal.

Compared with the conventional technology, the above technical solutions have the following advantages. In the technical solutions according to the embodiments of the present disclosure, the first braking waveform signal includes at least two pulses, and among the at least two pulses, an amplitude of a preceding pulse is greater than an amplitude of a succeeding pulse, so that the vibration of the linear resonance actuator can be reduced based on a current amplitude of the vibration of the linear resonance actuator, thereby avoiding a case that an amplitude of the first braking waveform signal is larger than the amplitude of the vibration of the linear resonance motor. The case that the amplitude of the first braking waveform signal is larger than the amplitude of the vibration of the linear resonance motor may result in over braking that causes the direction of the vibration of the linear resonance actuator to be opposite.

BRIEF DESCRIPTION OF THE DRAWINGS

In order to illustrate technical solutions in embodiments of the present disclosure or in the conventional technology more clearly, drawings to be used in the description of the embodiments or the conventional technology are introduced simply hereinafter. It is apparent that the drawings described below show only some embodiments of the present disclosure. For those skilled in the art, other drawings may be obtained based on the provided drawings without any creative work.

DETAILED DESCRIPTION OF THE EMBODIMENTS

Technical solutions in embodiments of the present disclosure are described clearly and completely in conjunction with drawings in the embodiments of the present disclosure hereinafter. It is apparent that the described embodiments are only some rather than all embodiments of the present disclosure. All other embodiments obtained by those skilled in the art based on the embodiments of the present disclosure without any creative work fall within the protection scope of the present disclosure.

In the following description, many specific details are set forth in order to fully understand the present disclosure. However, the present disclosure may be implemented in other ways different from those described herein. Those skilled in the art can make similar promotion without departing from the connotation of the present disclosure. Therefore, the present disclosure is not limited by the embodiments disclosed below.

As described in the background part, after the linear resonance actuator implements the tactile feedback, how to fast and effectively brake the linear resonance actuator becomes an urgent technical problem to be solved by those skilled in the art.

Figure 1:
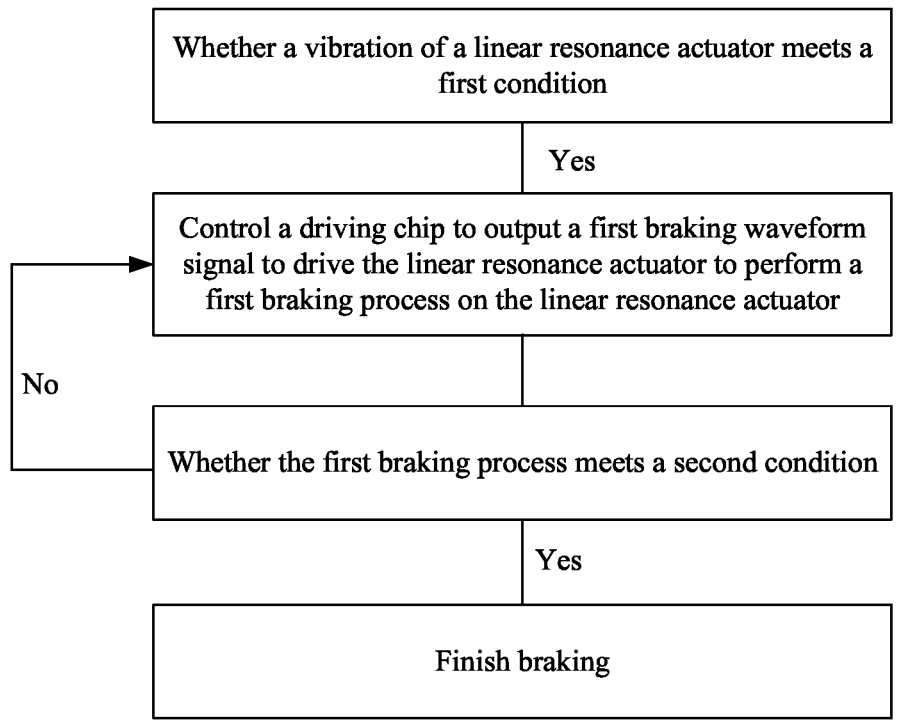
FIG. 1 is a flowchart of a method for braking a linear resonance device according to an embodiment of the present disclosure.

In view of this, a method for braking a linear resonance device is provided according to an embodiment of the present disclosure. The linear resonance device includes a linear resonance actuator and a driving chip. The driving chip pre-stores a driving waveform signal and at least one first braking waveform signal. As shown in FIG. 1, the method includes the following steps S1 to S3.

In step S1, it is determined, in response to a braking instruction, whether a vibration of the linear resonance actuator under driving of the driving waveform signal meets a first condition.

Optionally, in an embodiment of the present disclosure, the vibration of the linear resonance actuator meeting the first condition includes that the vibration of the linear resonance actuator is a short vibration. In this embodiment, the first condition is that duration of the vibration of the linear resonance actuator is less than a first time period. In another embodiment of the present disclosure, the first condition may be that the vibration of the linear resonance actuator meets other parameter, which is not limited in the present disclosure, and depends on an actual situation.

In step S2, in a case that the vibration of the linear resonance actuator meets the first condition, the driving chip is controlled to output the first braking waveform signal to drive the linear resonance actuator to perform a first braking process on the linear resonance actuator.

It should be noted that, in the embodiment of the present disclosure, a phase of the first braking waveform signal is opposite to a phase of the driving waveform signal, so that a driving force with a direction opposite to a direction of the vibration of the linear resonance actuator is supplied to the linear resonance actuator based on the first braking waveform signal, to reduce an amplitude of the vibration of the linear resonance actuator so as to brake the linear resonance actuator.

Optionally, in an embodiment of the present disclosure, the first braking waveform signal includes at least two pulses. Among the at least two pulses, an amplitude of a preceding pulse is greater than an amplitude of a succeeding pulse, so that the vibration of the linear resonance actuator can be reduced based on a current amplitude of the vibration of the linear resonance actuator, thereby avoiding a case that an amplitude of the first braking waveform signal is larger than the amplitude of the vibration of the linear resonance motor. The case that the amplitude of the first braking waveform signal is larger than the amplitude of the vibration of the linear resonance motor may result in over braking that causes a direction of the vibration of the linear resonance actuator to be opposite.

Based on the above embodiment, in an embodiment of the present disclosure, the first braking waveform signal includes a first pulse and a second pulse. The driving chip being controlled to output the first braking waveform signal to drive the linear resonance actuator includes the driving chip being controlled to output the first pulse prior to the second pulse. An amplitude AMP(i) of the first pulse and an amplitude AMP(i+1) of the second pulse meet the following equation:

$$AMP(i+1)=\mathrm{floor}(N*AMP(i)/2^m).$$

In the above equation, i represents an integer not less than 1. N represents a pulse amplitude attenuation factor. m represents the number of bits of the pulse amplitude attenuation factor stored in a register. A floor function is a ROUNDDOWN function.

It should be noted that in the embodiment of the present disclosure, the pulse amplitude attenuation factor N may be set based on different waveform signals, so as to better brake the linear resonance actuator. N and m are not limited in the embodiment of the present disclosure and depend on the actual situation.

Based on the above embodiment, in an alternative embodiment of the present disclosure, the first pulse and the second pulse are two adjacent pulses in the first braking waveform signal, which is not limited in the present disclosure, and depends on the actual situation.

Optionally, in an embodiment of the present disclosure, the pulse amplitude attenuation factor N is an integer, and m is also an integer. For example, m may be set to 8 (that is, the pulse amplitude attenuation factor has stored in an 8-bit register). The first pulse with the amplitude AMP(i) and the second pulse with the amplitude AMP(i+1) are any two adjacent pulses in the first braking waveform signal. The amplitude AMP(i) of the first pulse and the amplitude AMP(i+1) of the second pulse meet the following equation: $AMP(i+1)=\mathrm{floor}(N*AMP(i)/2^m)$.

Figure 2:
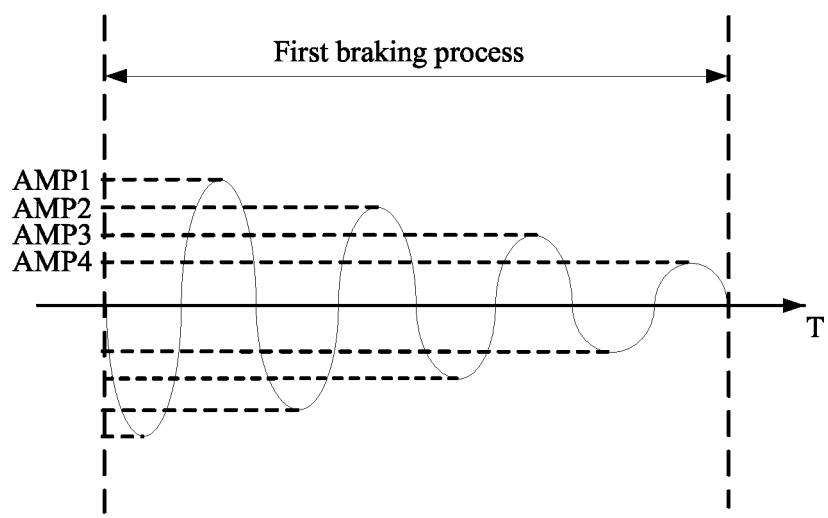
FIG. 2 is a schematic diagram showing a first braking waveform signal in a method for braking a linear resonance device according to an embodiment of the present disclosure.

An amplitude of a pulse subsequent to the second pulse and the amplitude AMP(i+1) of the second pulse meet an equation similar to the above equation, and so on, until the driving chip stops outputting the first braking waveform signal. Reference is made to in FIG. 2, which is a schematic diagram showing a first braking waveform signal stored in the driving chip in a method for braking a linear resonance device according to an embodiment of the present disclosure. In FIG. 2, an amplitude AMP1 of a first pulse and an amplitude AMP2 of a second pulse meet the following equation: $AMP2=\mathrm{floor}(N*AMP1/2^m)$. The amplitude AMP2 of the second pulse and an amplitude AMP3 of a third pulse meet the following equation: $AMP3=\mathrm{floor}(N*AMP2/2^m)$.

The amplitude AMP3 of the third pulse and an amplitude AMP4 of a fourth pulse meet the following equation:

$$AMP4=\text{floor}(N*AMP3/2^m).$$

In an embodiment of the present disclosure, an amplitude of a first pulse in the first braking waveform signal is the same as an amplitude of the driving waveform signal, which is not limited in the present disclosure, and depends on the actual situation.

In step S3, in a case that the first braking process meets a second condition, the driving chip is controlled to stop outputting the first braking waveform signal, to finish braking the linear resonance actuator.

Optionally, in an embodiment of the present disclosure, the second condition includes that the number of pulses in the first braking waveform signal outputted by the driving chip reaches a first preset value. When the number of pulses in the first braking waveform signal outputted by the driving chip reaches the first preset value, the driving chip is controlled to stop outputting the first braking waveform signal, to finish braking the linear resonance actuator.

It should be noted that, the first preset value is not limited in the embodiment of the present disclosure, and depends on actual situations such as the amplitude of the vibration of the linear resonance actuator under driving of the driving waveform signal, and braking requirements of the linear resonance actuator.

Based on any one of the above embodiments, in an embodiment of the present disclosure, the first braking waveform signal may be a sinusoidal waveform signal, a cosine waveform signal, a square waveform signal or other waveform signal, which is not limited in the present disclosure and depends on the actual situation.

Based on any one of the above embodiments, in an embodiment of the present disclosure, the linear resonance actuator may simulate vibrations in various scenarios, such as a vibration for an incoming call, a vibration for a text message, a vibration of an alarm clock, a vibration of a clock dial, and a heartbeat in a mobile phone, and shooting and punching in some games, so as to provide feedbacks in various scenarios.

Based on the above embodiment, in an embodiment of the present disclosure, the driving chip stores one first braking waveform signal. In the embodiment of the present disclosure, the driving chip being controlled to output the first braking waveform signal to drive the linear resonance actuator to perform the first braking process on the linear resonance actuator includes that the driving chip is controlled to output the same first braking waveform signal to drive the linear resonance actuator to perform the first braking process on the linear resonance actuator, so as to brake the linear resonance actuator in various scenarios based on the same first braking waveform signal.

In another embodiment of the present disclosure, the driving chip stores at least two first braking waveform signals. In the embodiment of the present disclosure, the driving chip being controlled to output the first braking waveform signal to drive the linear resonance actuator to perform a first braking process on the linear resonance actuator includes that: the driving chip is controlled to output a first braking waveform signal matching a current application scenario of the vibration of the linear resonance actuator, to drive the linear resonance actuator to perform the first braking process on the linear resonance actuator, so as to brake the linear resonance actuator in the current application scenario based on the first braking process matching the current application scenario. Optionally, in the embodiment of the present disclosure, one scenario corresponds to one first braking waveform signal.

Based on the above embodiment, in an embodiment of the present disclosure, one first braking waveform signal corresponds to one scenario. That is, in this embodiment, the application scenarios of the vibration of the linear resonance actuator are in one-to-one correspondence with first braking waveform signals. Therefore, first braking waveform signals are utilized based on different scenarios respectively to perform the first braking process, so as to brake the linear resonance actuator timely with a high speed and a short time period, which is not limited in the present disclosure, and depends on the actual situation.

Based on the above embodiment, in an embodiment of the present disclosure, the driving chip is controlled to output the first braking waveform signal to drive the linear resonance actuator to perform the first braking process on the linear resonance actuator as follows. Based on a current application scenario of the vibration of the linear resonance actuator, a first braking waveform signal matching the current application scenario of the vibration of the linear resonance actuator is acquired. The driving chip is controlled to output the first braking waveform signal matching the current application scenario to drive the linear resonance actuator to perform the first braking process on the linear resonance actuator, so as to brake the linear resonance actuator in the current application scenario based on the first braking waveform signal matching the current application scenario.

Optionally, based on the above embodiment, in an embodiment of the present disclosure, based on the current application scenario of the vibration of the linear resonance actuator, the first braking waveform signal matching the current application scenario of the vibration of the linear resonance actuator is acquired as follows. A first database is searched to acquire the first braking waveform signal matching the current application scenario of the vibration of the linear resonance actuator based on the current application scenario of the vibration of the linear resonance actuator, which is not limited in the present disclosure, and it depends on the actual situation.

It should be noted that, in any one of the above embodiments, each first braking waveform signal may have at least one parameter different from that of another first braking waveform signal. The parameter may include at least one of a frequency of a pulse, an amplitude of a pulse, a period of a pulse, or the number of pulses in the first braking waveform signal, which is not limited in the present disclosure, and depends on the actual situation.

It should be further noted that in a case that the vibration of the linear resonance actuator under driving of the driving waveform signal has a small amplitude or a short period, the linear resonance actuator can be braked better with the above method. In a case that the vibration of the linear resonance actuator under driving of the driving waveform signal has a large amplitude or a long period, a long time period is required for braking the linear resonance actuator with the above method.

Figure 3:
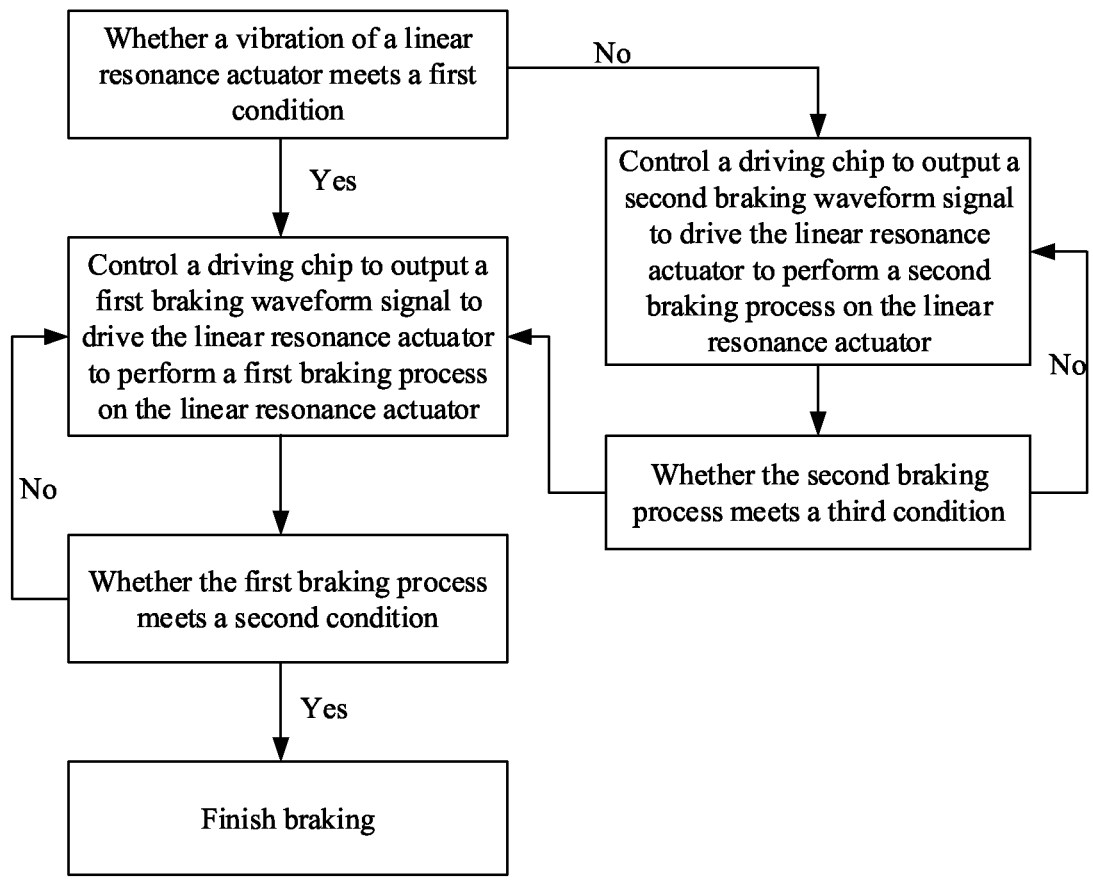
FIG. 3 is a flowchart of a method for braking a linear resonance device according to another embodiment of the present disclosure.

Therefore, based on the above embodiment, in an embodiment of the present disclosure, the driving chip further stores at least one second braking waveform signal. As shown in FIG. 3, the method further includes: in a case that the vibration of the linear resonance actuator does not meet the first condition, controlling the driving chip to output the second braking waveform signal to drive the linear resonance actuator to perform a second braking process on the linear resonance actuator; in a case that the second braking process meets a third condition, controlling the driving chip to output the first braking waveform signal to drive the linear resonance actuator to perform the first braking process on the linear resonance actuator; and in a case that the first braking process meets the second condition, controlling the driving chip to stop outputting the first braking waveform signal, to finish braking the linear resonance actuator.

It should be noted that, in the above embodiment, in the case that the vibration of the linear resonance actuator meets the first condition, the driving chip is controlled to directly output the first braking waveform signal to drive the linear resonance actuator to perform the first braking process on the linear resonance actuator. In addition, in the case that the first braking process meets the second condition, the driving chip is controlled to stop outputting the first braking waveform signal, to finish braking the linear resonance actuator.

It should be further noted that, in the embodiment of the present disclosure, a phase of the second braking waveform signal is opposite to the phase of the driving waveform signal, so that a driving force with a direction opposite a direction of the vibration of the linear resonance actuator is supplied to the linear resonance actuator based on the second braking waveform signal, to reduce an amplitude of the vibration of the linear resonance actuator so as to brake the linear resonance actuator.

In addition, in an embodiment of the present disclosure, the second braking waveform signal includes at least one pulse. An amplitude of the pulse in the second braking waveform signal is not less than a maximum amplitude among amplitudes of pulses in the first braking waveform signal, so that the linear resonance actuator can be slowed rapidly based on the second braking waveform signal, and a small vibration of the linear resonance actuator can be slightly adjusted based on the first braking waveform signal, so as to stop the small vibration of the linear resonance actuator to the most extent, thereby preventing the linear resonance actuator from being over-braked by driving the linear resonance actuator based on a waveform signal with a large amplitude.

Based on the above embodiment, in an embodiment of the present disclosure, the second braking process meeting the third condition includes that the number of pulses in the second braking waveform signal outputted by the driving chip reaches a second preset value, which is not limited in the present disclosure. In other embodiments of the present disclosure, the third condition met by the second braking process may further be other condition, which depends on the actual situation.

It should be noted that in a case that the second braking process meeting the third condition includes that the number of pulses in the second braking waveform signal outputted by the driving chip reaches the second preset value, the second preset value is not limited in the present disclosure and may be set based on the actual situation of the linear resonance actuator. Optionally, in an embodiment of the present disclosure, the second preset value is greater than 0 and less than or equal to 15, which is not limited in the present disclosure, and depends on the actual situation.

Optionally, in an embodiment of the present disclosure, a period of the first braking waveform signal is equal to a period of the second braking waveform signal.

Figure 4:
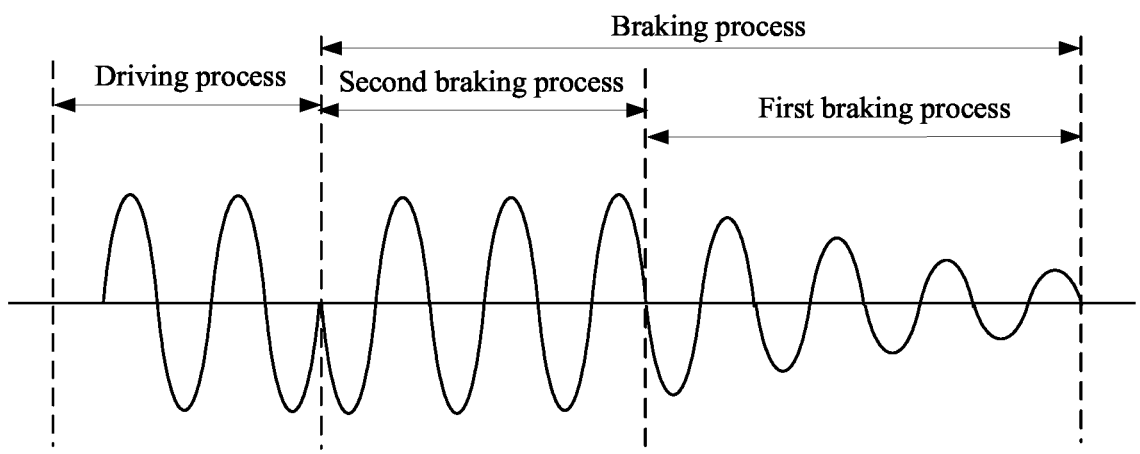
FIG. 4 is a schematic diagram showing a driving waveform signal, a first braking waveform signal and a second braking waveform signal in a method for braking a linear resonance device according to an embodiment of the present disclosure.

Based on the above embodiment, in an embodiment of the present disclosure, the second braking waveform signal may be a sinusoidal waveform signal, a cosine waveform signal, a square waveform signal or other waveform signal, which is not limited in the present disclosure, and depends on the actual situation. Reference is made to FIG. 4, which is a schematic diagram showing a driving waveform signal, a first braking waveform signal and a second braking waveform signal in a method for braking a linear resonance device according to an embodiment of the present disclosure.

Optionally, based on the above embodiment, in an embodiment of the present disclosure, the second braking waveform signal includes at least two pulses. The at least two pulses in the second braking waveform signal have the same amplitude, which is not limited in the present disclosure, and depends on the actual situation.

Based on the above embodiment, in an embodiment of the present disclosure, a maximum amplitude among amplitudes of pulses in the first braking waveform signal is the same as an amplitude of any one of the at least two pulses in the second braking waveform signal. In another embodiment of the present disclosure, a maximum amplitude among amplitudes of pulses in the first braking waveform signal may be less than the amplitude of the pulse in the second braking waveform signal, which is not limited in the present disclosure, and depends on the actual situation.

Optionally, in an embodiment of the present disclosure, an amplitude AMP of the pulse in the second braking waveform signal and a maximum amplitude AMP1 among amplitudes of pulses in the first braking waveform signal meet the following equation:

$$AMP1=\text{floor}(N*AMP/2^m)$$

In the above equation, N represents a pulse amplitude attenuation factor. m represents the number of bits of the pulse amplitude attenuation factor stored in a register. A floor function is a ROUNDDOWN function.

Based on any one of the above embodiments, in an embodiment of the present disclosure, the pulse in the first braking waveform signal may have a same frequency as the pulse in the second braking waveform signal or a different frequency from the pulse in the second braking waveform signal, which is not limited in the present disclosure, and depends on the actual situation.

It can be seen from the foregoing that, the linear resonance actuator may simulate vibrations in various scenarios, such as a vibration for an incoming call, a vibration for a text message, a vibration of an alarm clock, a vibration of a clock dial, and a heartbeat in a mobile phone, and shooting and punching in some games, so as to provide feedbacks in various scenarios.

Based on the above embodiment, in an embodiment of the present disclosure, the driving chip stores one second braking waveform signal. In the embodiment of the present disclosure, the driving chip being controlled to output the second braking waveform signal to drive the linear resonance actuator to perform the second braking process on the linear resonance actuator includes that the driving chip is controlled to output the same second braking waveform signal to drive the linear resonance actuator to perform the second braking process on the linear resonance actuator, so as to brake the linear resonance actuator in various scenarios based on the same second braking waveform signal.

In another embodiment of the present disclosure, the driving chip stores at least two second braking waveform signals. In the embodiment of the present disclosure, the driving chip being controlled to output the second braking waveform signal to drive the linear resonance actuator to perform the second braking process on the linear resonance actuator includes that: the driving chip is controlled to output a second braking waveform signal matching a current application scenario of the vibration of the linear resonance actuator, to drive the linear resonance actuator to perform a second braking process on the linear resonance actuator, so as to brake the linear resonance actuator in the current application scenario based on the second braking waveform signal matching the current application scenario. Optionally, in the embodiment of the present disclosure, one scenario corresponds to one second braking waveform signal.

Based on the above embodiment, in an embodiment of the present disclosure, one second braking waveform signal corresponds to one scenario. That is, in this embodiment, the application scenarios of the vibration of the linear resonance actuator are in one-to-one correspondence with second braking waveform signals. Therefore, second braking waveform signals are utilized based on different scenarios respectively to perform the second braking process, so as to brake the linear resonance actuator timely with a high speed and a short time period, which is not limited in the present disclosure, and depends on the actual situation.

Based on the above embodiment, in an embodiment of the present disclosure, the driving chip is controlled to output the second braking waveform signal to drive the linear resonance actuator to perform the second braking process on the linear resonance actuator as follows. Based on a current application scenario of the vibration of the linear resonance actuator, a second braking waveform signal matching the current application scenario of the vibration of the linear resonance actuator is acquired. The driving chip is controlled to output the second braking waveform signal matching the current application scenario to drive the linear resonance actuator to perform the second braking process on the linear resonance actuator, so as to brake the linear resonance actuator in the current application scenario based on the second braking waveform signal matching the current application scenario.

Optionally, based on the above embodiment, in an embodiment of the present disclosure, based on the current application scenario of the vibration of the linear resonance actuator, a second braking waveform signal matching the current application scenario of the vibration of the linear resonance actuator is acquired as follows. A second database is searched to acquire the second braking waveform signal matching the current application scenario based on the current application scenario of the vibration of the linear resonance actuator, which is not limited in the present disclosure, and depends on the actual situation.

It should be noted that, in any one of the above embodiments, each second braking waveform signal may have at least one parameter different from that of another second braking waveform signal. The parameter may include at least one of a frequency of a pulse, an amplitude of a pulse, a period of a pulse, or the number of pulses in the second braking waveform signal, which is not limited in the present disclosure, and depends on the actual situation.

Based on any one of the above embodiments, in a case that the driving chip stores multiple first braking waveform signals and multiple second braking waveform signals, in an embodiment of the present disclosure, the multiple first braking waveform signals are in one-to-one correspondence with the multiple second braking waveform signals. In another embodiment of the present disclosure, one first braking waveform signal corresponds to one second braking waveform signal, and one second braking waveform signal also corresponds to one first braking waveform signal. However, there is no one-to-one correspondence between first braking waveform signals and second braking waveform signals.

Optionally, in an embodiment of the present disclosure, first braking waveform signals and second braking waveform signals may form multiple combined waveform signals and the multiple combined waveform signals are fixed, which is not limited in the present disclosure. In other embodiments of the present disclosure, first braking waveform signals may be separate from second braking waveform signals without a combined waveform signal. That is, based on a current application scenario of the vibration of the linear resonance actuator, the driving chip may select a second braking waveform signal matching the current application scenario from at least one second braking waveform signal for the second braking process, and select a first braking waveform signal matching the current application scenario from at least one first braking waveform signal for the first braking process, which is not limited in the present disclosure, and depends on the actual situation.

Figure 5:
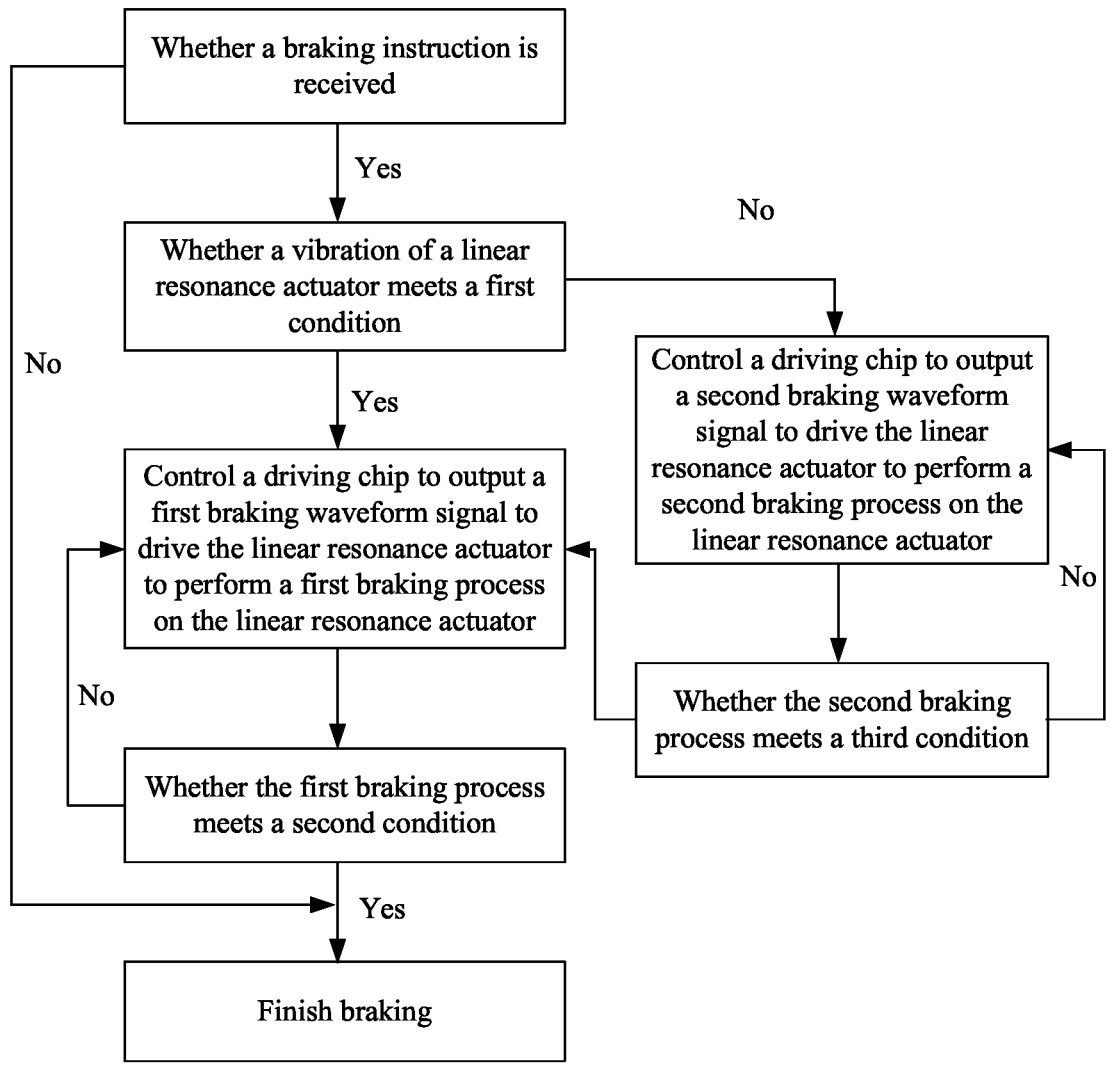
FIG. 5 is a flowchart of a method for braking a linear resonance device according to another embodiment of the present disclosure.

Based on any one of the above embodiments, in an embodiment of the present disclosure, as shown in FIG. 5, the method further includes: determining whether a braking instruction is received when stopping outputting the driving waveform signal; braking the linear resonance actuator in response to the braking instruction if it is determined that the braking instruction is received; and not braking the linear resonance actuator if it is determined that no braking instruction is received.

It should be noted that different linear resonance actuators may vibrate at different frequencies. In a case that the different linear resonance actuators vibrating at different frequencies are braked based on braking waveform signals with the same frequency, there may be a deviation, for example, a deviation of 5 Hz, between a frequency the braking waveform signal and the frequency of the vibration of the linear resonance actuator. In order to better brake the linear resonance actuator with the method according to the embodiment of the present disclosure, based on any one of the above embodiments, in an embodiment of the present disclosure, the method further includes: adjusting a frequency of the first braking waveform signal outputted by the driving chip based on a frequency of the vibration of the linear resonance actuator under driving of the driving waveform signal, to calibrate the frequency of the first braking waveform signal, so that a difference between the frequency of the first braking waveform signal and the frequency of the vibration of the linear resonance actuator is less than a third preset value, thereby reducing the deviation between the frequency of the first braking waveform signal and the frequency of the vibration of the resonance actuator.

Optionally, based on the above embodiment, in an embodiment of the present disclosure, the frequency of the first braking waveform signal outputted by the driving chip is adjusted based on the frequency of the vibration of the linear resonance actuator under driving of the driving waveform signal, to adjust a period corresponding to the frequency of the first braking waveform signal to a period corresponding to the frequency of the vibration of the linear resonance actuator, so as to improve a tactile feedback effect of the linear resonance actuator, which is not limited in the present disclosure. In other embodiments of the present disclosure, the third preset value may be other value, which depends on the actual situation.

It should be noted that in a case that the driving chip stores the second braking waveform signal, the method further includes: adjusting a frequency of the second braking waveform signal outputted by the driving chip based on the frequency of the vibration of the linear resonance actuator under driving of the driving waveform signal, to calibrate the frequency of the second braking waveform signal, so that a difference between the frequency of the second braking waveform signal and the frequency of the vibration of the linear resonance actuator is less than a fourth preset value, thereby reducing a deviation between the frequency of the second braking waveform signal and the frequency of the vibration of the resonance actuator.

Optionally, based on the above embodiment, in an embodiment of the present disclosure, the frequency of the second braking waveform signal outputted by the driving chip is adjusted based on the frequency of the vibration of the linear resonance actuator under driving of the driving waveform signal, to adjust a period corresponding to the frequency of the second braking waveform signal to a period corresponding to the frequency of the vibration of the linear resonance actuator, so as to further improve the tactile feedback effect of the linear resonance actuator, which it is not limited in the present disclosure. In other embodiments of the present disclosure, the fourth preset value may be other value, which depends on the actual situation.

It can be seen from the foregoing that, with the method according to the embodiments of the present disclosure, it can be determined whether to perform only the first braking process or perform both the first braking process and the second braking process based on the vibration of the linear resonance actuator and the application scenario of the vibration of the linear resonance actuator. Moreover, in each of the braking processes, parameters such as the braking waveform signal, the number of pulses in a braking waveform signal, an amplitude of a pulse and the pulse amplitude attenuation factor may be set based on the vibration of the linear resonance actuator and the application scenario of the vibration of the linear resonance actuator. Therefore, with the method, the linear resonance actuator can be braked better based on the vibration of the linear resonance actuator and the application scenario of the vibration of the linear resonance actuator.

It can be seen that, with the method for braking a linear resonance device according to the embodiments of the present disclosure, the braking waveform signal and parameters in the braking process are flexibly set, so that the linear resonance actuator under driving of the driving waveform signal in various application scenarios can be braked fast and effectively.

Figure 6:
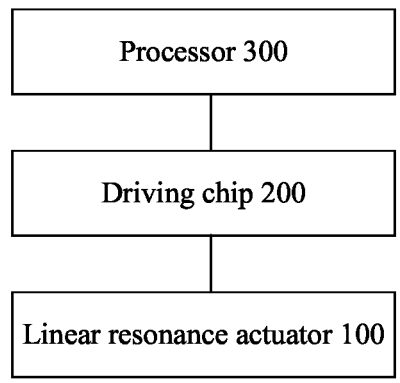
FIG. 6 is a schematic structural diagram of a linear resonance device according to an embodiment of the present disclosure.

Accordingly, a linear resonance device is further provided according to an embodiment of the present disclosure. As shown in FIG. 6, the linear resonance device includes a linear resonance actuator 100, a driving chip 200 and a processor 300. The driving chip 200 stores a driving waveform signal and a first braking waveform signal.

The processor 300 is configured to: in response to a braking instruction, determine whether a vibration of the linear resonance actuator under driving of the driving waveform signal meets a first condition; in a case that the vibration of the linear resonance actuator meets the first condition, controlling the driving chip to output the first braking waveform signal to drive the linear resonance actuator to perform a first braking process on the linear resonance actuator; and in a case that the first braking process meets a second condition, controlling the driving chip to stop outputting the first braking waveform signal, to finish braking the linear resonance actuator.

The first braking waveform signal includes at least two pulses. Among the at least two pulses, an amplitude of a preceding pulse is greater than an amplitude of a succeeding pulse, so that the vibration of the linear resonance actuator can be reduced based on a current amplitude of the vibration of the linear resonance actuator, thereby avoiding a case that an amplitude of the first braking waveform signal is larger than the amplitude of the vibration of the linear resonance motor. The case that the amplitude of the first braking waveform signal is larger than the amplitude of the vibration of the linear resonance motor may result in over braking that causes the direction of the vibration of the linear resonance actuator to be opposite.

It should be noted that, in the embodiment of the present disclosure, a phase of the first braking waveform signal is opposite to a phase of the driving waveform signal, so that a driving force with a direction opposite to a direction of the vibration of the linear resonance actuator is supplied to the linear resonance actuator based on the first braking waveform signal, to reduce an amplitude of the vibration of the linear resonance actuator so as to brake the linear resonance actuator.

Optionally, in an embodiment of the present disclosure, the vibration of the linear resonance actuator meeting the first condition includes that the vibration of the linear resonance actuator is a short vibration. In this embodiment, the first condition is that duration of the vibration of the linear resonance actuator is less than a first time period. In another embodiment of the present disclosure, the first condition may be that the vibration of the linear resonance actuator meets other parameter, which is not limited in the present disclosure, and depends on an actual situation.

Figure 7:
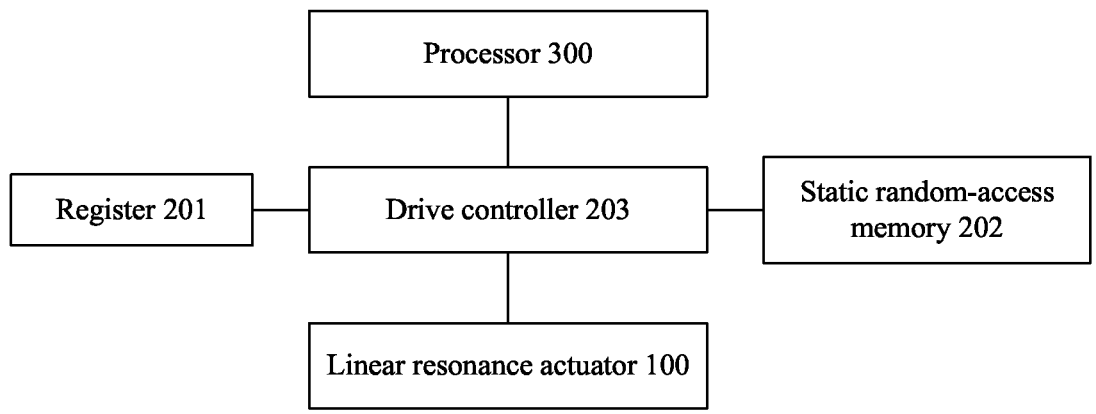
FIG. 7 is a schematic structural diagram of a linear resonance device according to another embodiment of the present disclosure.

Based on any one of the above embodiments, in an embodiment of the present disclosure, as shown in FIG. 7, the driving chip includes a register 201, a static random-access memory (SRAM) 202 and a drive controller 203. The static random-access memory 202 pre-stores a first braking waveform signal. In a case that the vibration of the linear resonance actuator meets the first condition, the processor 300 outputs a first control instruction. The register 201 outputs a first enable signal in response to the first control instruction, to trigger the drive controller to read the first braking waveform signal in the static random-access memory, to perform a first braking process on the linear resonance actuator.

Based on the above embodiment, in an embodiment of the present disclosure, the first braking waveform signal in the static random-access memory is preset based on the vibration and an application scenario of the linear resonance actuator. In a case that the vibration and the application scenario of the linear resonance actuator change, the first braking waveform signal in the static random-access memory may be adjusted or rewritten.

It should further be noted that, in the embodiment of the present disclosure, the first braking waveform signal is in the static random-access memory. If the linear resonance device is powered down, the first braking waveform signal in the static random-access memory is required to be rewritten, which is not limited in the present disclosure. In another embodiment of the present disclosure, the first braking waveform signal may be stored in other storage element, which depends on the actual situation.

Based on the above embodiment, in an embodiment of the present disclosure, the first braking waveform signal includes a first pulse and a second pulse. The driving chip being controlled to output the first braking waveform signal to drive the linear resonance actuator includes the driving chip being controlled to output the first pulse prior to the second pulse. An amplitude AMP(i) of the first pulse and an amplitude AMP(i+1) of the second pulse meet the following equation:

$$AMP(i+1)=\text{floor}(N*AMP(i)/2^m)$$

In the above equation, i represents an integer not less than 1. N represents a pulse amplitude attenuation factor. m represents the number of bits of the pulse amplitude attenuation factor stored in a register. A floor function is a ROUNDDOWN function.

It should be noted that, N and m are not limited in the embodiment of the present disclosure, and depend on the actual situation.

Based on the above embodiment, in an alternative embodiment of the present disclosure, the first pulse and the second pulse are two adjacent pulses in the first braking waveform signal, which is not limited in the present disclosure, and depends on the actual situation.

Optionally, in an embodiment of the present disclosure, the pulse amplitude attenuation factor N is an integer, and m is also an integer. For example, m may be set to 8 (that is, the pulse amplitude attenuation factor has a value stored in an 8-bit register). The first pulse with the amplitude AMP(i) and the second pulse with the amplitude AMP(i+1) are any two adjacent pulses in the first braking waveform signal. The amplitude AMP(i) of the first pulse and the amplitude AMP(i+1) of the second pulse meet the following equation: $AMP(i+1)=\text{floor}(N*AMP(i)/2^m)$. An amplitude of a pulse subsequent to the second pulse and the amplitude AMP(i+1) of the second pulse meet an equation similar to the above equation, and so on, until the driving chip stops outputting the first brake waveform.

In an embodiment of the present disclosure, an amplitude of a first pulse in the first braking waveform signal is the same as an amplitude of the driving waveform signal, which is not limited in the present disclosure, and depends on the actual situation.

Optionally, in an embodiment of the present disclosure, the second condition includes that the number of pulses in the first braking waveform signal outputted by the driving chip reaches a first preset value. When the number of pulses in the first braking waveform signal outputted by the driving chip reaches the first preset value, the driving chip is controlled to stop outputting the first braking waveform signal, to finish braking the linear resonance actuator.

It should be noted that, the first preset value is not limited in the embodiment of the present disclosure, and depends on actual situations such as the amplitude of the vibration of the linear resonance actuator under driving of the driving waveform signal, and braking requirements of the linear resonance actuator.

Based on any one of the above embodiments, in an embodiment of the present disclosure, the first braking waveform signal may be a sinusoidal waveform signal, a cosine waveform signal, a square waveform signal or other waveform signal, which is not limited in the present disclosure and depends on the actual situation.

Based on any one of the above embodiments, in an embodiment of the present disclosure, the linear resonance actuator may simulate vibrations in various scenarios, such as a vibration for an incoming call, a vibration for a text message, a vibration of an alarm clock, a vibration of a clock dial, and a heartbeat in a mobile phone, and shooting and punching in some games, so as to provide feedbacks in various scenarios.

Based on the above embodiment, in an embodiment of the present disclosure, the static random-access memory stores one first braking waveform signal. In the embodiment of the present disclosure, the driving chip being controlled to output the first braking waveform signal to drive the linear resonance actuator to perform the first braking process on the linear resonance actuator includes that the driving chip is controlled to output the same first braking waveform signal to drive the linear resonance actuator to perform the first braking process on the linear resonance actuator, so as to brake the linear resonance actuator in various scenarios based on the same first braking waveform signal.

In another embodiment of the present disclosure, the static random-access memory stores at least two first braking waveform signals. In the embodiment of the present disclosure, the driving chip being controlled to output the first braking waveform signal to drive the linear resonance actuator to perform a first braking process on the linear resonance actuator includes that: the driving chip is controlled to output a first braking waveform signal matching a current application scenario of the vibration of the linear resonance actuator, to drive the linear resonance actuator to perform the first braking process on the linear resonance actuator, so as to brake the linear resonance actuator in the current application scenario based on the first braking process matching the current application scenario. Optionally, in the embodiment of the present disclosure, one scenario corresponds to one first braking waveform signal.

Based on the above embodiment, in an embodiment of the present disclosure, one first braking waveform signal corresponds to one scenario. That is, in this embodiment, the application scenarios of the vibration of the linear resonance actuator are in one-to-one correspondence with first braking waveform signals. Therefore, first braking waveform signals are utilized based on different scenarios respectively to perform the first braking process, so as to brake the linear resonance actuator timely with a high speed and a short time period, which is not limited in the present disclosure, and depends on the actual situation.

Based on the above embodiment, in an embodiment of the present disclosure, the driving chip is controlled to output the first braking waveform signal to drive the linear resonance actuator to perform the first braking process on the linear resonance actuator as follows. Based on a current application scenario of the vibration of the linear resonance actuator, a first braking waveform signal matching the current application scenario of the vibration of the linear resonance actuator is acquired. The driving chip is controlled to output the first braking waveform signal matching the current application scenario to drive the linear resonance actuator to perform the first braking process on the linear resonance actuator, so as to brake the linear resonance actuator in the current application scenario based on the first braking waveform signal matching the current application scenario.

Optionally, based on the above embodiment, in an embodiment of the present disclosure, based on the current application scenario of the vibration of the linear resonance actuator, the processor is configured to acquire the first braking waveform signal matching the current application scenario of the vibration of the linear resonance actuator as follows. The processor searches a first database to acquire the first braking waveform signal matching the current application scenario of the vibration of the linear resonance actuator based on the current application scenario of the vibration of the linear resonance actuator, which is not limited in the present disclosure, and it depends on the actual situation.

It should be noted that, in any one of the above embodiments, each first braking waveform signal may have at least one parameter different from that of another first braking waveform signal. The parameter may include at least one of a frequency of a pulse, an amplitude of a pulse, a period of a pulse, or the number of pulses in the first braking waveform signal, which is not limited in the present disclosure, and depends on the actual situation.

It should be further noted that in a case that the vibration of the linear resonance actuator under driving of the driving waveform signal has a small amplitude or a short period, the linear resonance actuator can be braked better with the above linear resonance device. In a case that the vibration of the linear resonance actuator under driving of the driving waveform signal has a large amplitude or a long period, a long time period is required for braking the linear resonance actuator with the above linear resonance device.

Therefore, based on the above embodiment, in an embodiment of the present disclosure, the static random-access memory further stores at least one second braking waveform signal. In a case that the vibration of the linear resonance actuator does not meet the first condition, the processor is configured to output a second control instruction, and the register is configured to, in response to the second control instruction, generate a second enable signal to trigger the driving chip to output the second braking waveform signal to drive the linear resonance actuator to perform a second braking process on the linear resonance actuator. In a case that the second braking process meets a third condition, the processor is configured to output a first control instruction, and the register is configured to, in response to the first control instruction, generate a first enable signal to trigger the driving chip to output the first braking waveform signal to drive the linear resonance actuator to perform the first braking process on the linear resonance actuator. In a case that the first braking process meets the second condition, the processor is configured to control the driving chip to stop outputting the first braking waveform signal, to finish braking the linear resonance actuator.

It should be noted that, in the above embodiment, in a case that the vibration of the linear resonance actuator meets the first condition, the processor is further configured to output a third control instruction and a first control instruction. The register is configured to output a third enable signal and a first enable signal in response to the third control instruction and the first control instruction, to control the drive controller to perform the first braking process rather than the first braking process to brake the linear resonance actuator.

In an embodiment of the present disclosure, the first enable signal has a value of 1, the second enable signal has a value of 1, and the third enable signal has a value of 0, which is not limited in the present disclosure, and depends on the actual situation.

It should further be noted that, in an embodiment of the present disclosure, the second braking waveform signal includes at least one pulse. An amplitude of the pulse in the second braking waveform signal is not less than a maximum amplitude among amplitudes of pulses in the first braking waveform signal, so that the linear resonance actuator can be slowed rapidly based on the second braking waveform signal, and a small vibration of the linear resonance actuator can be slightly adjusted based on the first braking waveform signal, so as to stop the small vibration of the linear resonance actuator to the most extent, thereby preventing the linear resonance actuator from being over-braked by driving the linear resonance actuator based on a waveform signal with a large amplitude.

Based on the above embodiment, in an embodiment of the present disclosure, the second braking process meeting the third condition includes that the number of pulses in the second braking waveform signal outputted by the driving chip reaches a second preset value, which is not limited in the present disclosure. In other embodiments of the present disclosure, the third condition met by the second braking process may further be other condition, which depends on the actual situation.

It should be noted that in a case that the second braking process meeting the third condition includes that the number of pulses in the second braking waveform signal outputted by the driving chip reaches the second preset value, the second preset value is not limited in the present disclosure and may be set based on the actual situation of the linear resonance actuator. Optionally, in an embodiment of the present disclosure, the second preset value is greater than 0 and less than or equal to 15, which is not limited in the present disclosure, and depends on the actual situation.

Optionally, in an embodiment of the present disclosure, a period of the first braking waveform signal is equal to a period of the second braking waveform signal.

Based on the above embodiment, in an embodiment of the present disclosure, the second braking waveform signal may be a sinusoidal waveform signal, a cosine waveform signal, a square waveform signal or other waveform signal, which is not limited in the present disclosure, and depends on the actual situation.

Optionally, based on the above embodiment, in an embodiment of the present disclosure, the second braking waveform signal includes at least two pulses. The at least two pulses in the second braking waveform signal have a same amplitude, which is not limited in the present disclosure, and depends on the actual situation.

Based on the above embodiment, in an embodiment of the present disclosure, a maximum amplitude among amplitudes of pulses in the first braking waveform signal is the same as an amplitude of any one of the at least two pulses in the second braking waveform signal. In another embodiment of the present disclosure, a maximum amplitude among amplitudes of pulses in the first braking waveform signal may be less than the amplitude of the pulse in the second braking waveform signal, which is not limited in the present disclosure, and depends on the actual situation.

Optionally, in an embodiment of the present disclosure, an amplitude AMP of the pulse in the second braking waveform signal and a maximum amplitude AMP1 among amplitudes of pulses in the first braking waveform signal meet the following equation:

$$AMP1=\text{floor}(N*AMP/2^m).$$

In the above equation, N represents a pulse amplitude attenuation factor. m represents the number of bits of the pulse amplitude attenuation factor stored in a register. A floor function is a ROUNDDOWN function.

Based on any one of the above embodiments, in an embodiment of the present disclosure, the pulse in the first braking waveform signal may have a same frequency as the pulse in the second braking waveform signal or a different frequency from the pulse in the second braking waveform signal, which is not limited in the present disclosure, and depends on the actual situation.

Based on the above embodiment, in an embodiment of the present disclosure, the static random-access memory stores one second braking waveform signal. In the embodiment of the present disclosure, the driving chip being controlled to output the second braking waveform signal to drive the linear resonance actuator to perform the second braking process on the linear resonance actuator includes that the driving chip is controlled to output the same second braking waveform signal to drive the linear resonance actuator to perform the second braking process on the linear resonance actuator, so as to brake the linear resonance actuator in various scenarios based on the same second braking waveform signal.

In another embodiment of the present disclosure, the static random-access memory stores at least two second braking waveform signals. In the embodiment of the present disclosure, the driving chip being controlled to output the second braking waveform signal to drive the linear resonance actuator to perform the second braking process on the linear resonance actuator includes that: the driving chip is controlled to output a second braking waveform signal matching a current application scenario of the vibration of the linear resonance actuator, to drive the linear resonance actuator to perform the second braking process on the linear resonance actuator, so as to brake the linear resonance actuator in the current application scenario based on the second braking waveform signal matching the current application scenario. Optionally, in the embodiment of the present disclosure, one scenario corresponds to one second braking waveform signal.

Based on the above embodiment, in an embodiment of the present disclosure, one second braking waveform signal corresponds to one scenario. That is, in this embodiment, the application scenarios of the vibration of the linear resonance actuator are in one-to-one correspondence with second braking waveform signals. Therefore, second braking waveform signals are utilized based on different scenarios respectively to perform the second braking process, so as to brake the linear resonance actuator timely with a high speed and a short time period, which is not limited in the present disclosure, and depends on the actual situation.

Based on the above embodiment, in an embodiment of the present disclosure, the driving chip is controlled to output the second braking waveform signal to drive the linear resonance actuator to perform the second braking process on the linear resonance actuator as follows. Based on a current application scenario of the vibration of the linear resonance actuator, a second braking waveform signal matching the current application scenario of the vibration of the linear resonance actuator is acquired. The driving chip is controlled to output the second braking waveform signal matching the current application scenario to drive the linear resonance actuator to perform the second braking process on the linear resonance actuator, so as to brake the linear resonance actuator in the current application scenario based on the second braking waveform signal matching the current application scenario.

Optionally, based on the above embodiment, in an embodiment of the present disclosure, based on the current application scenario of the vibration of the linear resonance actuator, a second braking waveform signal matching the current application scenario of the vibration of the linear resonance actuator is acquired as follows. A second database is searched to acquire the second braking waveform signal matching the current application scenario of the vibration of the linear resonance actuator based on the current application scenario, which is not limited in the present disclosure, and depends on the actual situation.

It should be noted that, in any one of the above embodiments, each second braking waveform signal may have at least one parameter different from that of another second braking waveform signal. The parameter may include at least one of a frequency of a pulse, an amplitude of a pulse, a period of a pulse, or the number of pulses in the second braking waveform signal, which is not limited in the present disclosure, and depends on the actual situation.

Based on any one of the above embodiments, in a case that the driving chip stores multiple first braking waveform signals and multiple second braking waveform signals, in an embodiment of the present disclosure, the multiple first braking waveform signals are in one-to-one correspondence with the multiple second braking waveform signals. In another embodiment of the present disclosure, one first braking waveform signal corresponds to one second braking waveform signal, and one second braking waveform signal also corresponds to one first braking waveform signal. However, there is no one-to-one correspondence between first braking waveform signals and second braking waveform signals.

Based on any one of the above embodiments, in an embodiment of the present disclosure, the processor is further configured to: determine whether a braking instruction is received when the driving chip stops outputting the driving waveform signal; brake the linear resonance actuator in response to the braking instruction if it is determined that the braking instruction is received; and not brake the linear resonance actuator if it is determined that no braking instruction is received.

In an embodiment of the present disclosure, in a case that no braking instruction is received when the driving chip stops outputting the driving waveform signal, the processor outputs a third control instruction and a fourth control instruction. The register outputs a third enable signal and a fourth enable signal in response to the third control instruction and the fourth control instruction, to control the drive controller to perform neither the first braking process nor the second braking process on the linear resonance actuator. Optionally, the third enable signal has a value 0, and the fourth enable signal has a value 0.

It should be noted that different linear resonance actuators may vibrate at different frequencies. In a case that the different linear resonance actuators vibrating at different frequencies are braked based on braking waveform signals with the same frequency, there may be a deviation, for example, a deviation of 5 Hz, between a frequency the braking waveform signal and the frequency of the vibration of the linear resonance actuator. In order to better brake the linear resonance actuator with the method according to the embodiment of the present disclosure, based on any one of the above embodiments, in an embodiment of the present disclosure, the linear resonance device further includes a clock chip. The processor is further configured to: adjust a sampling frequency of the clock chip to a preset frequency based on a frequency of the vibration of the linear resonance actuator under driving of the driving waveform signal, so that the driving chip reads the first braking waveform signal in the static random-access memory at the preset frequency to output the first braking waveform signal, so as to calibrate the frequency of the first braking waveform signal. Therefore, a difference between the frequency of the first braking waveform signal and the frequency of the vibration of the linear resonance actuator is less than a third preset value, thereby reducing the deviation between the frequency of the first braking waveform signal and the frequency of the vibration of the resonance actuator.

Optionally, based on the above embodiment, in an embodiment of the present disclosure, the processor is configured to adjust the sampling frequency of the clock chip to a preset frequency based on the frequency of the vibration of the linear resonance actuator under driving of the driving waveform signal, so that the driving chip reads the first braking waveform signal in the static random-access memory at the preset frequency to output the first braking waveform signal, so as to adjust a period corresponding to the frequency of the first braking waveform signal to a period corresponding to the frequency of the vibration of the linear resonance actuator, thereby improving a tactile feedback effect of the linear resonance actuator, which is not limited in the present disclosure. In other embodiments of the present disclosure, the third preset value may be other value, which depends on the actual situation.

It should be noted that in a case that the static random-access memory further stores the second braking waveform signal, the processor is further configured to: adjust the sampling frequency of the clock chip to a preset frequency based on the frequency of the vibration of the linear resonance actuator under driving of the driving waveform signal, so that the driving chip reads the second braking waveform signal in the static random-access memory at the preset frequency to output the second brake waveform, so as to calibrate the frequency of the second braking waveform signal, so that a difference between the frequency of the second braking waveform signal and the frequency of the vibration of the linear resonance actuator is less than a fourth preset value, thereby reducing a deviation between the frequency of the second braking waveform signal and the frequency of the vibration of the resonance actuator.

Optionally, based on the above embodiment, in an embodiment of the present disclosure, the processer is configured to adjust the sampling frequency of the clock chip to a preset frequency based on the frequency of the vibration of the linear resonance actuator under driving of the driving waveform signal, so that the driving chip reads the second braking waveform signal in the static random-access memory at the preset frequency to output the second braking waveform signal, so as to adjust a period corresponding to the frequency of the second braking waveform signal to a period corresponding to the frequency of the vibration of the linear resonance actuator, thereby further improving the tactile feedback effect of the linear resonance actuator, which is not limited in the present disclosure. In other embodiment of the present disclosure, the fourth preset value may be other value, which depends on the actual situation.

It can be seen from the foregoing that, with the linear resonance device according to the embodiments of the present disclosure, it can be determined whether to perform only the first braking process or perform both the first braking process and the second braking process based on the vibration of the linear resonance actuator and the application scenario of the vibration of the linear resonance actuator. Moreover, in each of the braking processes, parameters such as the braking waveform signal, the number of pulses in a braking waveform signal, an amplitude of a pulse and the pulse amplitude attenuation factor may be set based on the vibration of the linear resonance actuator and the application scenario of the vibration of the linear resonance actuator. Therefore, with the linear resonance device, the linear resonance actuator can be braked better based on the vibration of the linear resonance actuator and the application scenario of the vibration of the linear resonance actuator. It can be seen that, with the linear resonance device according to the embodiments of the present disclosure, the braking waveform signal and parameters in the braking process are flexibly set, so that the linear resonance actuator under driving of the driving waveform signal in various application scenarios can be braked fast and effectively.

In summary, with the linear resonance device and the method for braking the linear resonance device according to the embodiments of the present disclosure, the linear resonance actuator in the linear resonance device can be braked fast and effectively. A linear resonance actuator having either a short vibration or a long vibration can be braked timely with a high speed and a short time period, to avoid vibration smearing of the linear resonance actuator.

Parts of the present disclosure are described in a progressive manner, each of which emphasizes differences from others. The same or similar parts among all the parts can be referred to each other.

Based on the above description of the disclosed embodiments, those skilled in the art can implement or carry out the present disclosure. It is apparent for those skilled in the art to make many modifications to these embodiments. The general principle defined herein may be applied to other embodiments without departing from the spirit or scope of the present disclosure. Therefore, the present disclosure is not limited to the embodiments illustrated herein, but should be defined by the widest scope consistent with the principle and novel features disclosed herein.

The invention claimed is:

1. A method for braking a linear resonance device, wherein
the linear resonance device comprises a linear resonance actuator and a driving chip, the driving chip pre-stores a driving waveform signal and a first braking waveform signal, and the method comprises:
in response to a braking instruction, determining whether a vibration of the linear resonance actuator under driving of the driving waveform signal meets a first condition;
in a case that the vibration of the linear resonance actuator meets the first condition, controlling the driving chip to output the first braking waveform signal to drive the linear resonance actuator to perform a first braking process on the linear resonance actuator;
and in a case that the first braking process meets a second condition, controlling the driving chip to stop outputting the first braking waveform signal, to finish braking the linear resonance actuator, wherein
the first braking waveform signal comprises at least two pulses, and among the at least two pulses, an amplitude of a preceding pulse is greater than an amplitude of a succeeding pulse.

2. The method according to claim 1, wherein the first braking waveform signal comprises a first pulse and a second pulse, wherein
the controlling the driving chip to output the first braking waveform signal to drive the linear resonance actuator comprises: controlling the driving chip to output the first pulse prior to the second pulse;
and an amplitude AMP(i) of the first pulse and an amplitude AMP(i+1) of the second pulse meet the following equation:

$$AMP(i+1)=\text{floor}(N*AMP(i)/2^m);$$

wherein i represents an integer not less than 1, N represents a pulse amplitude attenuation factor, m represents the number of bits of the pulse amplitude attenuation factor stored in a register, and a floor function is a ROUNDDOWN function.

3. The method according to claim 1, wherein the second condition comprises that the number of pulses in the first braking waveform signal outputted by the driving chip reaches a first preset value.

4. The method according to claim 1, wherein the driving chip further pre-stores at least one second braking waveform signal, wherein the method further comprises:

in a case that the vibration of the linear resonance actuator does not meet the first condition, controlling the driving chip to output the second braking waveform signal to drive the linear resonance actuator to perform a second braking process on the linear resonance actuator;

in a case that the second braking process meets a third condition, controlling the driving chip to output the first braking waveform signal to drive the linear resonance actuator to perform the first braking process on the linear resonance actuator; and in a case that the first braking process meets the second condition, controlling the driving chip to stop outputting the first braking waveform signal, to finish braking the linear resonance actuator, wherein the second braking, waveform signal comprises at least one pulse, and an amplitude of the pulse in the second braking waveform signal is not less than a maximum amplitude among amplitudes of pulses in the first braking waveform signal.

5. The method according to claim 4, wherein the second braking waveform signal comprises at least two pulses, and the at least two pulses in the second braking waveform signal have a same amplitude.

6. The method according to claim 5, wherein the maximum amplitude among amplitudes of pulses in the first braking waveform signal is the same as an amplitude of any one of the gat least two pulses in the second braking waveform signal.

7. The method according to claim 4, wherein the pulse in the second braking waveform signal has a same frequency as the pulse in the first braking waveform signal.

8. The method according, to claim 1, further comprising: adjusting a frequency of the first braking waveform signal outputted by the driving chip based on a frequency of the vibration of the linear resonance actuator under driving of the driving waveform signal.

9. The method according to claim 1, further comprising: determining whether a braking instruction is received when stopping outputting the driving waveform signal.

10. A linear resonance device, comprising:
a linear resonance actuator;
a driving chip; and
a processor, wherein
the driving chip is configured to pre-store a driving waveform signal and a first braking waveform signal; and
the processor is configured to:
in response to a braking instruction, determine whether a vibration of the linear resonance actuator under driving of the driving waveform signal meets a first condition;
in a case that the vibration of the linear resonance actuator meets the first condition, control the driving chip to output the first braking waveform signal to drive the linear resonance actuator to perform a first braking process on the linear resonance actuator; and
in a case that the first braking process meets a second condition, control the driving chip to stop outputting the first braking waveform signal, to finish braking the linear resonance actuator, wherein
the first braking waveform signal comprises at least two pulses, and among the at least two pulses, an amplitude of a preceding pulse is greater than an amplitude of a succeeding pulse.

11. The linear resonance device according to claim 10, wherein the driving chip comprises a register, a static random-access memory and a drive controller, wherein the static random-access memory is configured to pre-store a first braking waveform signal;

the processor is configured to output a first control instruction in the case that the vibration of the linear resonance actuator meets the first condition; and the register is configured to, in response to the first control instruction, trigger the drive controller to read the first braking waveform signal in the static random-access memory to perform the first braking process on the linear resonance actuator.

12. The linear resonance device according to claim 10, wherein the first braking waveform signal comprises a first pulse and a second pulse, wherein the driving chip being configured to output the first braking waveform signal to drive the linear resonance actuator comprises the driving chip being configured to output the first pulse prior to the second pulse, and an amplitude AMP(i) of the first pulse and an amplitude AMP(i+1) of the second pulse meet the following equation:

$$AMP(i+1)=\text{floor}(N*AMP(i)/2^m);$$

wherein i represents an integer not less than 1, N represents a pulse amplitude attenuation factor, m represents the number of bits of the pulse amplitude attenuation factor stored in a register, and a floor function is a ROUNDDOWN function.

13. The linear resonance device according to claim 10, wherein the second condition comprises that the number of pulses in the first braking, waveform signal outputted by the driving chip reaches a first preset value.

14. The linear resonance device according to claim 11, wherein the static random-access memory further pre-stores at least one second braking waveform signal, wherein in a case that the vibration of the linear resonance actuator does not meet the first condition, the processor is configured to output a second control instruction, and the register is configured to, in response to the second control instruction, trigger the driving chip to Output the second braking waveform signal to drive the linear resonance actuator to perform a second braking process on the linear resonance actuator;

in a case that the second braking process meets a third condition, the processor is configured to output a first control instruction, and the register is configured to, in response to the first control instruction, trigger the driving chip to output the first braking waveform signal to drive the linear resonance actuator to perform the first braking process on the linear resonance actuator; and in a case that the first braking process meets the second condition, the processor is configured to control the driving chip to stop outputting the first braking waveform signal, to finish braking the linear resonance actuator, wherein the second braking waveform signal comprises at least one pulse, and an amplitude of the pulse in the second braking waveform signal is not less than a maximum amplitude among amplitudes of pulses in the first braking waveform signal.

15. The linear resonance device according to claim 14, wherein the second braking waveform signal comprises at least two pulses, and the at least two pulses in the second braking waveform signal have a same amplitude.

16. The linear resonance device according to claim 15, the maximum amplitude among amplitudes of pulses in the first braking waveform signal is the same as an amplitude of any one of the at least two pulses in the second braking waveform signal.

17. The linear resonance device according to claim 14, wherein the pulse in the second braking waveform signal has a same frequency as the pulse in the first braking waveform signal.

18. The linear resonance device according to claim 11, further comprising a clock chip, wherein the processor is further configured to: adjust a sampling frequency of the clock chip to a preset frequency based on a frequency of the vibration of the linear resonance actuator under driving of the driving waveform signal, to control the driving chip to read the first braking waveform signal in the static random-access memory at the preset frequency, to output the first braking waveform signal.

19. A driving chip comprising: a register, a static random-access memory and a drive controller, wherein
the static random-access memory is configured to pre-store a first braking waveform signal; and
the register is configured to, in response to a first control instruction, trigger the drive controller to read the first braking waveform signal in the static random-access memory to perform a first braking process on a linear resonance actuator,
wherein the first braking waveform signal comprises a first pulse and a second pulse, and the first pulse is outputted prior to the second pulse, and an amplitude AMP(i) of the first pulse and an amplitude AMP(i+1) of the second pulse meet the following equation:

$$AMP(i+1) = \text{floor} * AMP(i)/2^m;$$

wherein i represents an integer not less than 1, N represents a pulse amplitude attenuation factor, m represents the number of bits of the pulse amplitude attenuation factor stored in a register, and a floor function is a ROUNDDOWN function.

* * * * *